United States Patent Office 3,183,248
Patented May 11, 1965

---

3,183,248
ESTERS OF TRIMELLITIC ANHYDRIDE
Arthur G. Hirsch, Dyer, and Richard E. Van Strien, Griffith, Ind., assignors to Standard Oil Company, Chicago, Ill., a corporation of Indiana
No Drawing. Filed Aug. 2, 1961, Ser. No. 128,671
3 Claims. (Cl. 260—346.3)

This invention relates to a new class of organic compounds. More particularly, it relates to novel anhydro derivatives of trimellitic anhydride, and a method for their preparation.

Specifically, the invention provides new and particularly useful bis-anhydrides having the formula

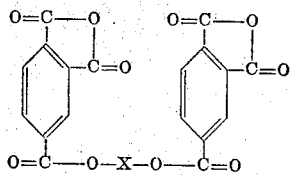

wherein the group (—O—X—O—) is derived from an alkane polyol having terminal hydroxyl groups and X represents the atoms of the polyol between the terminal hydroxyl groups.

It has been found that it is possible to prepare bis-anhydrides of trimellitic anhydride by coupling 2 molecules of trimellitic anhydride through the free carboxyl groups in the 4-position. Trimellitic anhydride is also known as the anhydride of trimellitic acid.

It has heretofore been unknown to react trimellitic anhydride with polyhydric compounds without destruction of the anhydride group. It has now been discovered that trimellitic anhydride can be reacted in a manner which permits the preparation of a monoester of 2 molecules of trimellitic anhydride linked together by means of a linking bridge furnished by an hereinafter defined alkane polyol, said linking being at the "4" position of the 2 anhydride molecules.

The compounds of this invention are prepared by reacting trimellitic anhydride with organic acid esters of alkane polyols under conditions that do not destroy the anhydride groups of the trimellitic anhydrides. The alkane polyols utilized in forming the compounds of the invention have terminal hydroxyl groups. The polyols having 2 to 12 carbon atoms are preferred. Illustrative of simple polyols containing terminal hydroxyl groups are the glycols such as ethylene glycol, 1,3-propanediol, 1,4-butanediol, 1,5-pentanediol, 1,6-hexanediol, 1,8-octanediol, 1,12-dodecanediol, etc. Alkane polyols containing three hydroxyl groups are illustrated by glycerol, trimethylol propane, triethylol propane. Pentaerythritol, a tetrahydroxy alkane polyol, can also be used. It is to be understod that the term "alkane polyol having terminal hydroxyl groups" means a polyol having hydroxyl groups substituted on the two terminal carbon atoms of the longest straight chain in the alkane polyol. It is intended to include those alkane polyols containing additional hydroxyl substituents in the molecule.

The actual reactant in the preparation of the bis-anhydro compound of the invention is an ester of the hereinbefore defined polyol. It is preferred to use the carboxylic acid esters and especially the alkanoic acids having 1–4 carbon atoms, such as acetic acid.

The trimellitic anhydride is reacted with the ester of the alkane polyol in the ratio of about 1–2 moles of trimellitic anhydride to about 0.5 to 1 mole of the ester, preferably 1 mole of trimellitic anhydride per terminal ester group of the alkane polyol esters. The reaction temperature for the ester-interchange is within the range of from about 175° C. to about 300° C., preferably from about 190° C. to about 230° C.

The following examples illustrate the preparation of the compounds of this invention. These examples are for illustrative purposes only and are not to be considered as limiting the invention.

Example 1

Into a 1 liter 3-necked flask equipped with a stirrer, a thermometer to measure temperature, and a Vigreux column equipped with a thermometer to measure the temperature of the distillate at the upper end prior to removal was charged 384 grams (2 moles) of trimellitic anhydride and 150 grams (1 mole) of ethylene glycol diacetate. The flask was heated until the trimellitic anhydride was molten at which time the stirrer was started. The pot temperature initially climbed to about 200° C. before any significant evolution of acetic acid was noted. At the start of the transesterification the acetic acid evolved so rapidly that the pot temperature dropped to as low as 180° C.–190° C. Continued heating increased the pot temperature to the reaction temperature range of 200° C.–210° C. Control of the reaction was maintained by a check of the thermometer at the top of the Vigreux column which was maintained at 115° F. to 120° F. indicating that acetic acid was coming off. About half way through the reaction period of vacuum of 50–100 mm. was applied to the reaction vessel to assist in the removal of the acetic acid effluent. The reaction was conducted for a period of 12–14 hours.

The crude reaction product had an acid number of 552 (theoretical 547) in acetone. When this reaction product was reacted with an excess of absolute methanol, a product was obtained having an acid number of 293 (theoretical 273) in methanol. Thus, the crude reaction product was a bis-anhydride ester of trimellitic anhydride coupled through the 4-positions with the ethylene bridge furnished by the ethylene glycol diacetate. The bis-anhydride product has the structure:

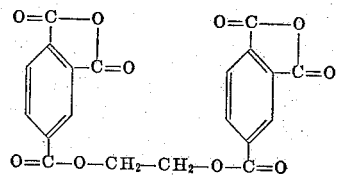

The bis-anhydride product obtained was a super-cooled glass. It is a mobile liquid at 50° C.; but on heating to higher temperatures, it crystalized and then remelted at 145°–155° C.

A liquid coating was prepared by dissolving 56 g. of the ethylene bis-(anhydro trimellitate) produced above and 100 g. of an epoxy resin (Epon 828) in acetone to approximately 50% solids. The liquid coating was applied to a tin panel and after curing at 300° F. for one hour gave a cured film having a thickness of 0.3 mil. The cured film had an impact resistance greater than 80 inch-pounds; remained flexible when bent over a ⅛″ mandrel; and was resistant to the solvents sodium hydroxide and acetone after 16 hours immersion therein.

Example II

A charge of 384 grams (2 moles) of trimellitic anhydride and 220 grams (1 mole) of triacetin were placed in a 1 liter 3-necked flask equipped with a stirrer, thermometer to measure reaction temperatures, and a reflux condenser (Vigreux column). Heat was applied and after the trimellitic anhydride was melted, the reactants were continuously stirred during the interchange reaction. The reaction was conducted with continuous stirring at a temperature of 200° C. to 250° C. with continuous removing of acetic acid from the reaction zone for a period of 16 hours. After 10 hours, a vacuum of about 100 mm. Hg was applied to the reaction vessel to aid in the removal of the acetic acid formed during the reaction. The reaction product in acetone had an acid number of 465 (theoretical 466). The product after reaction with methanol had an acid number of 231 (theoretical 233). The bis-anhydride product produced by the ester interchange of trimellitic anhydride and triacetin has the structure:

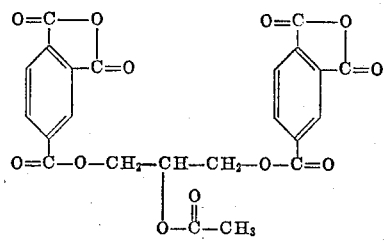

A liquid coating (ca. 50% solids) comprising 66 grams of the bis-anhydride of this example and 100 grams of epoxy resin Epon 1007 in Cellosolve acetate was applied to a Bonderite 100 metal panel. The coated panel was heated at a temperature of 300° F. for 1 hour giving a 1.4 mil cured film. The cured film had a 6H pencil hardness; withstood an impact of 160 inch-pounds; did not fracture when bent over a 1/8" mandrel; and was resistant to sodium hydroxide after immersion therein for 16 hours.

It has been found that when 3 moles of trimellitic anhydride were reacted with 1 mole of triacetin, there was recovered approximately 1 mole of unreacted trimellitic anhydride from the reaction mixture. The fact that all of the trimellitic anhydride did not react indicates that in order to prepare the compounds of this invention, the esters of the alkane polyols must be preferentially the primary esters and not those of secondary polyols. Consequently, the alkane polyol must have hydroxyl groups in the terminal positions.

It is to be understood that the compounds of this invention are useful for any purpose wherein an anhydride group is desirable. Particularly, these compounds are useful in the type of reactions where a compound such as pyromellitic dianhydride is utilized.

We claim:
1. A compound having a formula selected from the group consisting of Formula I

(I) 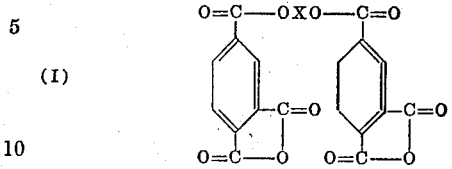

wherein X is a divalent $C_{2-12}$ alkylene radical and Formula II (II) 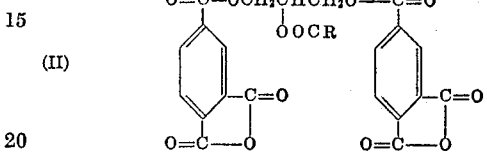

wherein R is selected from the group consisting of hydrogen and a $C_{1-3}$ alkyl group.

2. The compound having the formula

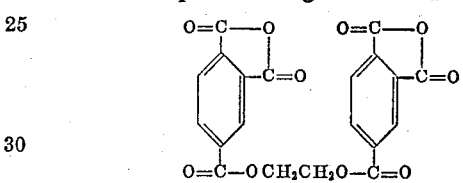

3. The compound having the formula

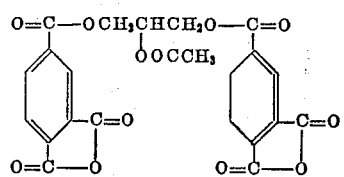

References Cited by the Examiner

UNITED STATES PATENTS 2,822,348  2/58  Haslam _____ 260—475
3,063,969  11/62  Stephens et al. _____ 260—346.3

OTHER REFERENCES

Groggins: Unit Processes in Organic Synthesis, Fourth Edition (1952), pages 619–20.

Dunbar et al.—J. Polymer Sci., vol. 21 (1956), pages 550–1.

IRVING MARCUS, *Primary Examiner.*

NICHOLAS S. RIZZO, *Examiner.*